W. W. McLAURIN.
PROCESS FOR MANUFACTURING DEXTRIN.
APPLICATION FILED JULY 20, 1915. RENEWED APR. 27, 1918.
1,283,839.
Patented Nov. 5, 1918.
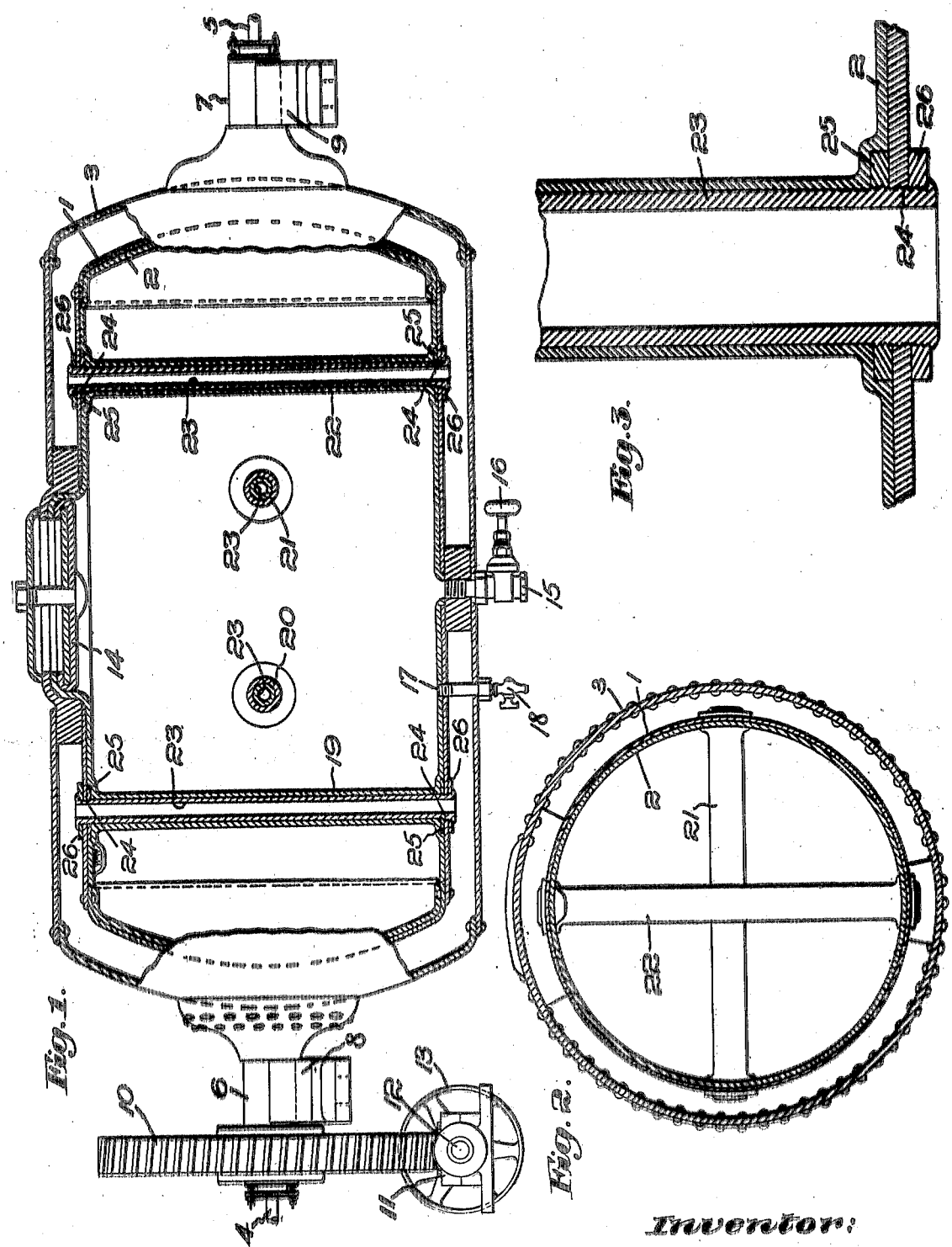
Inventor:
William W. McLaurin,
by Emery, Booth, Janney & Varney
Attys.

UNITED STATES PATENT OFFICE.

WILLIAM W. McLAURIN, OF BROOKFIELD, MASSACHUSETTS.

PROCESS FOR MANUFACTURING DEXTRIN.

1,283,839.  Specification of Letters Patent.   Patented Nov. 5, 1918.

Application filed July 20, 1915, Serial No. 41,010.  Renewed April 27, 1918.  Serial No. 231,282.

*To all whom it may concern:*

Be it known that I, WILLIAM W. MC-LAURIN, a subject of the King of Great Britain, and a resident of Brookfield, in the county of Worcester and State of Massachusetts, have invented an Improvement in Processes for Manufacturing Dextrin, of which the following description, in connection with the accompanying drawings, is a specification, like characters on the drawings representing like parts.

This invention has reference to an improved process for manufacturing dextrin which may be employed as an adhesive or for any other purpose for which the dextrin of commerce is adapted to be utilized.

One of the objects of this invention is to so treat starch that such starch is converted into dextrin at a stage of hydrolysis at which the higher hydrolyzed intermediates are present, if at all, in negligible quantities.

Another object of the invention is to control the rate of speed of the process.

Other objects of the invention will appear from the following description.

The invention consists in the novel and improved process for manufacturing dextrin as shall hereinafter be more fully described and pointed out in the claims.

In the ordinary process of producing dextrin by the conversion of starch, by the wet process, starch and water with a small quantity of hydrochloric, sulfuric, acetic or other suitable acid is placed in an open vessel and the ingredients are stirred. At the same time steam is injected into the mass which in addition to supplying heat thereto adds an uncertain quantity of water. After the point of conversion is reached the fluid is concentrated and eventually substantially all of the moisture is evaporated, thus producing a comparatively hard material which requires the addition of water to reduce it to a consistency for use as an adhesive or for other purposes to which commercial dextrin is adapted.

In carrying my invention to practice one of my principal objects is to produce a dextrin ready to use as an adhesive or for other purposes without the addition of water. This requires that during the operation of my process the dextrin should have a greater degree of concentration than during the processes heretofore employed and at which degree of concentration, the conversion of the starch would not be completely accomplished without the assistance of certain steps in my process.

In carrying my improved process for manufacturing dextrin into operation I utilize a vessel having a steam jacket said vessel from its construction or operation being adapted to agitate or mix the contents thereof. Into this vessel I place approximately equal or suitable quantities of water and starch of any known kind and a small quantity of suitable acid which latter assists or may assist in the breaking up of the starch cells. I next close the vessel and supply steam to the jacket thereof, whereby the temperature of the contents of the vessel is raised and ultimately after the temperature of said contents reaches 212° F. pressure is generated in said vessel. At this time I also operate the machine in any manner to effect the agitation or mixing of the contents whereby convection is assisted. This agitation or mixing of the materials reduces the tendency of the formation of the tough, rubbery material ordinarily caused by the partial hydrolyzing of the starch, so that as the conversion proceeds the mixture is rendered smooth and reaction of the fluid but comparatively syrupy mixture toward a rubbery condition is avoided to a large degree but particularly after the critical temperature of about 230° F. is reached. After suitable conversion of the starch substantially at a point at which approximately 10% of sugar is present I arrest the process of conversion and reduce the temperature of the material.

The dextrin thus produced will contain a degree of acid which is not objectionable for many purposes and as a matter of fact for some purposes the presence of said acids and protein is desirable but for some other purposes where the dextrin is to be used as an adhesive on delicate materials it is desired to neutralize the acid to some extent and this is accomplished in any known manner.

In order to more clearly describe the principle of the present invention I have shown in the accompanying drawings, and shall hereinafter describe, a machine adapted for use in carrying out this improved process.

Figure 1 is a vertical longitudinal, central section embodying one form of apparatus by which the process may be practised.

Fig. 2 is a transverse section thereof.

Fig. 3 is a detail in section upon an enlarged scale taken through one of the steam circulating pipes.

My invention relates to the manufacture of dextrin from starch, to which end I employ any suitable starch and water. The starch may be obtained from corn, potato, sago, tapioca, or any other desired or suitable material. In carrying out my process, I preferably take equal parts of starch and cold water, making them into a smooth cream, free from all lumps. To this, I add a suitable acid, preferably in a small amount. I have obtained excellent results by employing a one-thousandth part of concentrated hydrochloric acid (specific gravity 1.19), that is, one tenth of one per cent. of the weight of the starch. This may in some cases be somewhat increased, the maximum being substantially three tenths of one per cent. of the weight of the starch. These figures are illustrative merely and are not given for purposes of precise limitation. These ingredients may be mixed either outside of or within the conversion chamber represented in the accompanying drawings, and which I will now specifically describe.

The said conversion chamber is herein represented as a closed vessel 1 of any suitable material having an acid resisting lining 2, preferably formed of lead. The said vessel is provided with a jacket 3 entirely surrounding the same for the reception of live steam which may be admitted through an inlet pipe 4 and discharged from an exit pipe 5. The said vessel is provided with trunnions 6, 7 received in or upon suitable bearings 8, 9, the steam inlet and exit pipes passing through said trunnions. I preferably rotate said vessel or digester, and herein for that purpose have represented a worm gear 10 fast on the trunnion 6 and meshing with and driven by a worm 11 on a shaft 12 having thereon fast and loose pulleys 13. The vessel or digester is provided with a man-hole 14 of any suitable construction and by means of which the described material may be placed within the vessel or digester. At some suitable point, and as herein shown, at a point opposite the man-hole 14, I provide a discharge opening 15 provided with a gate-valve 16 by means of which the contents may be withdrawn as quickly as possible, so that when the process is finished, the material may be run off before further conversion thereof takes place. Preferably I provide a smaller opening 17 having a pet-cock 18 to permit the drawing off of samples of the liquid during the carrying out of the process. In this manner, I may determine at any time just what stage of the conversion has been reached. Either the steam inlet or the steam outlet pipe is provided with a suitable safety valve, pressure gage and thermometer, the construction being such that I may permit the blowing off of the steam very rapidly, so as quickly to reduce the pressure within the vessel at any desired stage in the carrying out of the process.

The vessel 1 is provided with any suitable number of pipes extending therethrough in any desired direction. I have in the drawings represented four pipes respectively arranged in pairs at right angles to each other and of which the pipes 19, 21 and 23 are shown. These pipes are covered with lead or other suitable acid-resisting material, as indicated at 22. As indicated most clearly in Fig. 3, the lead or other covering for the pipes may be continuous with the lead lining 2. I have herein represented each of said pipes as having threaded ends 24 receiving nuts 25, 26 for securing them in position.

The said pipes perform the double purpose of assisting the breaking up of the material and the mixing thereof during the rotation of the vessel or digester, and also the bringing of the steam into more intimate relation with the mass within the vessel or digester. It is to be understood, however, that the steam within the jacket or pipes does not come in direct contact with the material. The said pipes therefore assist in the uniform conversion of the material. Any suitable number of pipes may be employed, and their arrangement may be varied within the scope of my invention. The illustrative digester constitutes the preferred embodiment of means for practising my process, but any other suitable means may be employed for carrying out said process.

I have previously stated that approximately equal parts of starch and cold water are mixed, and that I add a preferably small quantity of hydrochloric acid. The vessel is closed after being charged with said material, and by the introduction of steam through the inlet pipe 4, the heat is raised as quickly as possible, preferably to 284° F. (140° C.) with preferably substantially 52½ pounds steam pressure. While the relative proportions of the starch and water may be varied somewhat it is to be understood that a fluid product of somewhat high concentration is desired and the quantities of water used are proportioned to obtain this result. In the early stages of hydrolysis the starch tends to form a comparatively tough, highly viscous substance or mass which resists convection and conversion. In order to overcome such condition the vessel 1 is caused to rotate whereby the contents are subjected to a degree of centrifugal action as well as to the mixing action of the cross pipe members 19, 21, 23 whereby the contents of the vessel are so disturbed that the thorough hydrolyzing of the starch and a consequent uniformity in viscosity of the material results at or prior to the time at which the desired point of conversion is reached.

The heat is retained at a suitable temperature for a suitable length of time, which is preferably one half or three quarters of an hour, or until the test samples drawn off by the pet-cock 18 show the proper degree of conversion. When the desired conversion is obtained, the temperature is reduced as rapidly as possible by blowing off the steam within the jacket 3 and at the same time reducing the pressure within the vessel or digester, said pressure being caused by the heating of the water mixed with the starch. The dextrin thus obtained is in a free flowing, mobile solution, and is immediately ready for use, it being a solution or liquid. It is found to be liquid at ordinary temperatures, say 60° to 70° F. Commercial dextrins with which I am familiar are dry powders and must be dissolved in use.

I have ascertained that when the temperature reaches about 230° F. the unconverted mixture suddenly thins out or liquefies, and can be much more readily mixed. It is not essential to my process that the temperature be raised to 284° F., but by doing so, I save time and expedite the process. Until the temperature rises to about 230° to 232° F., the composition is a thick, rubbery, highly viscous mass, which it is difficult to work mechanically without destruction of the mixing apparatus. As above stated, at about 230° F. the material becomes comparatively thin and can be easily stirred or otherwise mechanically mixed. This action occurs with the minimum amount of acid.

In the carrying out of my process, no steam is allowed to enter into the material. I thereby obviate an irregular or uneven conversion, as where live steam at high pressure is employed, as in certain processes heretofore practised, that portion of the starch immediately in the path of the steam, is over converted, with the resulting production of glucose rather than dextrin. Furthermore, the injection of live steam directly into the material causes more or less dilution of the charge by the presence of a higher proportion of water to starch which also usually requires a larger amount of acid. In such prior use the dextrin solution must be evaporated or concentrated and the large amount of acid must be neutralized before the dextrin is in condition for use.

By the use of the process herein described of confining the starch, water and acid, and mixing or manipulating the same, particularly while subjecting them to indirect heat and pressure generated in said closed vessel as a result of such heat, I am enabled to so carry out the process of converting the starch to the desired point of conversion that at various points or stages of such conversion products intermediate starch and dextrin may be obtained which in all cases may be of a uniform nature and consistency throughout and of a quite accurately predetermined concentration.

It is of course evident that from time to time during the process I can withdraw test samples of the material from the pet-cock 18 whereby I can determine the point in the conversion then reached. Thus I am enabled to arrest the process at any desired point. I may thus obtain a product presenting throughout uniformly distributed partially converted starch or I may obtain a product or dextrin which is substantially free from starch and glucose. Attempts have heretofore been made to stop the conversion prior to the formation of a dextrin, free from starch and glucose, but the result heretofore has been a product which has not been uniform, a portion thereof being completely converted into dextrin, and another portion thereof being in an incomplete stage of conversion, that is, still a starch. By stopping the conversion at the particular point I may obtain (1) a soluble starch, (2) a dextrin containing more or less starch but in a homogeneous condition throughout or (3) a fully converted and perfect dextrin.

I have been enabled by my process to obtain with the utmost exactness the desired product, which may be a perfect dextrin or an incomplete dextrin without difficulty and without variation. This result I obtain by continuing the process for different lengths of time under determined conditions of manipulating or mixing, temperature and pressure. By practising my process for a fixed length of time of treatment, I may produce reliably and consistently a dextrin free or practically free from unconverted material and from glucose. This result is of the utmost importance, since the greatest possible adhesive power in dextrin is required. Any unconverted starch or glucose decreases the adhesive quality. By my process I also am enabled to obtain a fully converted dextrin whiter than so called fully converted dextrin of other processes, and in fact as white as starch. My process gives a colorless solution in contrast to the brown color of the usual so called fully converted dextrin now upon the market.

The effect of pressure is to accelerate conversion. Such pressure enables an elevated temperature to be attained and thus indirectly cause conversion, or it may itself cause disruption of the starch molecules. The shell of the starch granules bursts when heated and liberates the starchy matter. The pressure employed hastens the breaking up of the said shell of the starch granules and probably hastens the breaking up of the starch molecules themselves. The proportion of acid to starch used in carrying out my process is very much less than is required in the practice of processes with the same conditions of temperature of which I am familiar, and may be only one third as much or less. It is important, however, that too high a pressure be avoided, as it results in charring. The factors controlling my process are my temperature, pressure and acid concentration with the mechanical mixing.

In the claims I state that substantially equal quantities of commercially pure starch and water are employed. By this I mean that the two substances may be varied not more than ten per cent. either way, as for example 60% starch and 40% water. The mixing of the substances occurs while the same are subjected to the indirect action of steam. I am not limited to the mixing at any particular time.

I do not herein claim either the product resulting from my process or the apparatus herein shown for carrying out said process, the same being the subject matter of other applications.

By my process, all the starch is converted into dextrin at a stage of hydrolysis at which the higher hydrolyzed products, namely, maltose and dextrose, are present, if at all, in such small quanitities as to be negligible, the maltose being in combination with malto-dextrin.

The dextrin produced by my process of conversion may contain a comparatively small amount of acid and protein which for some purposes for which dextrin can be used, may be desirable. When the improved dextrin is to be used as an adhesive to be applied to delicate fabric or material which is liable to injury from such acid the acid can be neutralized in any known manner.

I control the rate of speed of the process by employing a small amount of acid, so that the reaction goes on at a safe speed and enables me to remove the product from the apparatus before there is formed any undue proportion of after products.

The solution formed as the result of my process constitutes a paper coating which is substantially free from hygroscopic effects, owing to its essential freedom from the higher converted products ordinarily present in dextrin as made by the usual methods, namely, maltose and dextrose and their combinations.

Having thus described my invention and the best mode known to me for carrying out the process thereof, I desire it to be understood that although specific terms are employed, they are used in a generic and descriptive sense and not for purposes of limitation, the scope of the invention being set forth in the following claims.

No claim is made herein to the product produced by the process as set forth, the same being reserved for and forming the subject-matter of my application filed on or about June 22, 1916, Serial No. 105,270.

Claims:

1. That process of manufacturing dextrin as a solution or liquid comprising placing equal parts of starch and cold water and a thousandth part of concentrated hydrochloric acid in a closed vessel, raising the temperature of said contents to substantially 284° F., mixing the contents of said vessel, continuing the process until the desired approximation to perfect dextrin is obtained and withdrawing the resulting solution.

2. That process of manufacturing dextrin as a solution or liquid comprising placing equal parts of starch and cold water and a thousandth part of concentrated hydrochloric acid within a closed chamber, effecting a thorough mixing of said contents, raising the said contents to a temperature of substantially 284° F. by the indirect application of steam heat, thereby subjecting the starch to a high degree of pressure, rapidly withdrawing said pressure and removing the resulting solution.

3. That process of producing substantially perfect, concentrated dextrin in the form of a solution or liquid, which comprises placing substantially equal quantities of commercially pure starch and water with a small quantity of acid within a closed vessel before conversion is effected, subjecting them to the indirect action of a heating agent, thereby to obtain a high pressure upon the starch during the treatment thereof, and mixing the mass.

4. That process of producing substantially perfect, concentrated dextrin in the form of a solution or liquid, which comprises placing substantially equal quantities of commercially pure starch and water with a small quantity of acid within a closed vessel before conversion is effected, subjecting them to the indirect action of steam, and thereby raising the temperature of the contents until the same is brought to a sufficiently liquefied condition to permit mixing, and effecting the application of a high degree of pressure, and mixing the mass.

5. That process of producing substantially perfect, concentrated dextrin in the form of a solution or liquid, which comprises placing substantially equal quantities of commercially pure starch and water with a quantity of acid of the hydrolytic equivalent of less than one per cent. of hydrochloric acid on the weight of the starch, within a closed vessel before conversion is effected, and subjecting them to the indirect action of steam, thereby to obtain a high pressure upon the starch during the treatment thereof, and mixing the mass.

6. That process of producing substantially perfect, concentrated dextrin in the form of a solution or liquid, which comprises placing substantially equal quantities of commercially pure starch and water with a quantity of acid of a hydrolytic equivalent of less than one per cent. of hydrochloric acid on the weight of the starch, within a closed vessel, subjecting them to the indirect action of steam, and thereby raising the temperature to at least 230° F., thereby to effect the liquefication of the starch necessary for mixing and for the production of a homogeneous product, and mixing the mass.

7. That process of producing substantially perfect, concentrated dextrin in the form of a solution or liquid, which comprises placing substantially equal quantities of commercially pure starch and water with a quantity of acid materially less than one per cent. of the weight of the starch within a closed vessel, raising the temperature of said contents to at least 230° F., thereby to effect the liquefication of the starch necessary for mixing it, and thereby effecting the application of a high degree of pressure, raising the temperature to a point between 250° F. and 300° F., and mixing the mass.

8. That process of producing substantially perfect, concentrated dextrin in the form of a solution or liquid which comprises placing substantially equal quantities of commercially pure starch and water together with a quantity of concentrated hydrochloric acid materially less than one per cent of the weight of the starch within a closed vessel, subjecting them to the indirect action only of steam, thereby to raise the temperature above 230° F., thus obtaining a high pressure upon the steam during the treatment thereof, mixing the contents and continuing said pressure until effecting thereby the uniform and homogeneous change in the entire starch contents, and whereby a fully converted dextrin is obtained in the form of a colorless solution, liquid at 60° to 70° F.

9. That process of producing substantially perfect, concentrated dextrin in the form of a solution or liquid, which comprises placing substantially equal quantities of commercially pure starch and water together with a quantity of acid materially less than one per cent. of the weight of the starch within a closed vessel, subjecting them to the indirect action only of steam, thereby to raise the temperature to substantially 280° F., thus obtaining a high pressure upon the starch during the treatment thereof, mixing the mass and continuing said pressure until effecting thereby the uniform and homogeneous change in the entire starch contents, and whereby a fully converted dextrin is obtained in the form of a colorless solution, liquid at 60° to 70° F.

10. That process of producing dextrin which consists in taking suitable proportions of starch and cold water, mixing them into a comparatively smooth cream, adding thereto a suitable acid, placing said acidulated cream in a vessel before hydrolysis is effected, closing said vessel to retain pressure generated therein, operating upon said cream mechanically to disturb the same, and subjecting said vessel to heat to generate pressure therein.

11. That process of producing dextrin which consists in taking suitable quantities of starch, water and acid and making a comparatively smooth cream thereof, confining the same before hydrolysis is effected, and effecting the mechanical mixing thereof under pressure generated from indirect heat.

12. That process of producing ready to use dextrin substantially uncolored which consists in taking starch and water in proportions determined by the purposed degree of concentration of the dextrin, adding a small amount of acid and mixing the substance to make a comparatively smooth cream thereof, confining such cream to prevent the access thereto of air and the escape therefrom of steam, subjecting the same to indirect heat during a suitable period, and reducing the pressure and temperature of the converted substance.

In testimony whereof, I have signed my name to this specification, in thepresence of two subscribing witnesses.

WILLIAM W. McLAURIN.

Witnesses:
L. A. BASSETT,
H. M. DONAHUE.